(No Model.)

J. CHILDS.
POTATO DIGGER.

No. 455,304. Patented July 7, 1891.

Witnesses:
H. E. Harrison
H. J. Levis

Inventor.
Jesse Childs
Per O. D. Levis
Att'y

UNITED STATES PATENT OFFICE.

JESSE CHILDS, OF WEST DEER, PENNSYLVANIA.

POTATO-DIGGER.

SPECIFICATION forming part of Letters Patent No. 455,304, dated July 7, 1891.

Application filed August 25, 1890. Serial No. 363,044. (No model.)

*To all whom it may concern:*

Be it known that I, JESSE CHILDS, a citizen of the United States, residing at West Deer township, in the county of Allegheny and State of Pennsylvania, have invented certain new and useful Improvements in Potato-Diggers; and I do hereby declare the following to be a full, clear, and exact description of the invention, such as will enable others skilled in the art to which it pertains to make and use the same, reference being had to the accompanying drawings, which form a part of this specification.

My invention relates to an improved machine for digging potatoes; and it consists in the peculiar construction and combination of parts, as will be fully set forth hereinafter.

Figure 1:
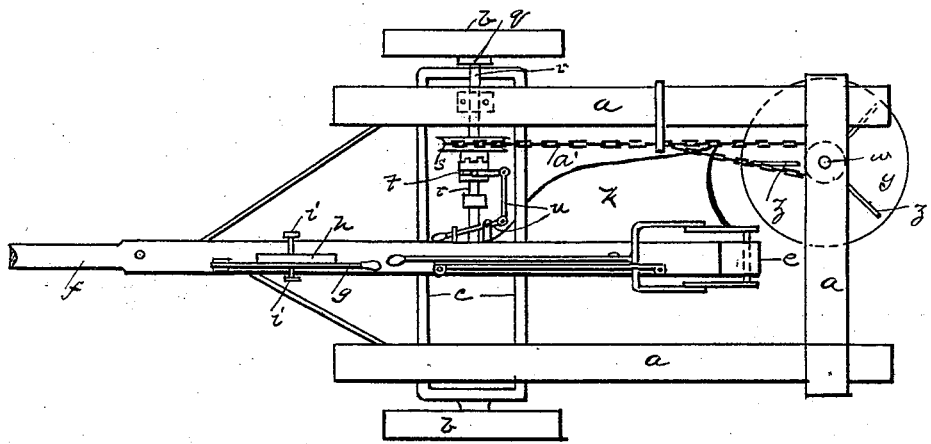
Figure 2:
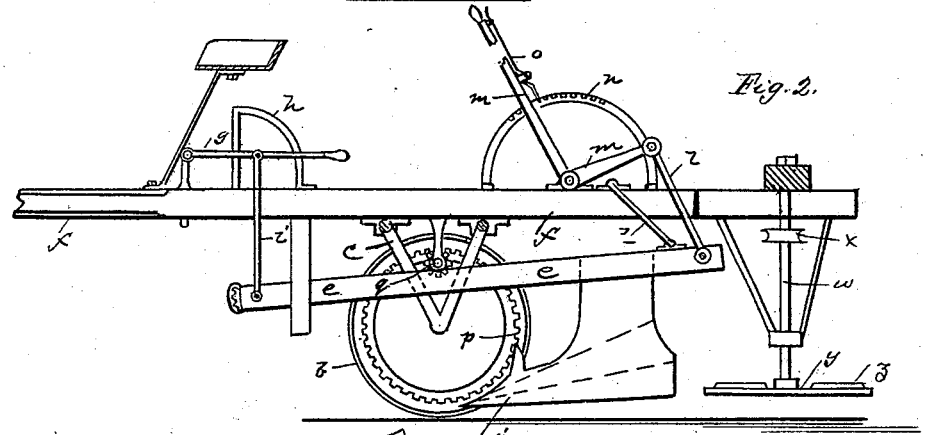
Figure 3:
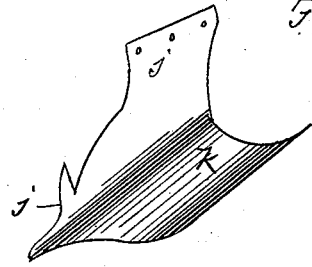

In the accompanying drawings, Figure 1 is a plan view of my improved machine, which is constructed in accordance with my invention. Fig. 2 is a side sectional elevation of the same. Fig. 3 is a perspective view of the plow and scoop.

To put my invention into practice I provide a frame $a$, of suitable size and form of construction, and mount the same on wheels $b$ by means of a double axle $c$. Suspended beneath this frame $a$, by means of a link $d$, is a beam $e$, the forward end of which is capable of being elevated or depressed and retained in various positions by the lever $g$, linked at $i$ to the beam $e$ and operating against a semicircular rack $h$. Rigidly attached to this beam $e$ is a plow $j$, having a scoop $k$ arranged at one side thereof, which is adapted to enter the earth and discharge the same at the rear of the apparatus.

Attached to the rear of the beam $e$ by means of a link $l$ is a crank-lever $m$, which is used to elevate or depress the rear end of the said beam $e$. This lever $m$ is operated in connection with a semicircular rack $n$, and is provided with a locking device $o$ to retain the same in any desired position.

Formed on the inner periphery of one of the wheels $b$ is a gear-wheel $p$, which meshes with a small pinion $q$, mounted rigidly on a short shaft $r$ extending across the machine. Loosely mounted on this last-mentioned shaft $t$ is a sprocket-wheel $s$, which may be made rigid with said shaft $r$ by means of a clutch $t$ operated by a shunt-lever $u$.

Secured in a vertical position at the rear of the machine is a shaft $w$, having a small sprocket-wheel $x$ attached thereto, and connected by a chain-belt $a'$ to the forward wheel $s$. This shaft $w$ is provided with a large disk $y$, placed in a horizontal position at the rear of the scoop $k$. Small upwardly-extending pieces $z$ are attached in radial positions to the top face of this disk $y$.

In operation, the plow $j$ is adjusted to enter at any depth into the ground by elevating or lowering the rear or forward end of the beam, the machine being drawn forward by horses hitched to the beam $e$. The lever $u$ is operated to throw the clutch $t$ and make the sprocket-wheel $s$ rigid with its shaft $r$, and give the said wheel $s$ a rapid rotary movement. This motion is transmitted to the disk $y$ by means of the chain-belt $a'$ and sprocket-wheel $x$. The earth lifted by the plow $j$ and scoop $k$ falls onto the disk $y$, and, the same having a rapid rotary movement, pulverizes the same and separates the potatoes. The small pieces $z$ throw the dirt and potatoes from the disk.

Having thus described my invention, I claim—

A machine for digging potatoes, comprising a frame supported by carrying-wheels, the longitudinal beam $e$, arranged centrally of the machine and linked at its rear end to said frame, the adjusting-levers $g$ $m$, linked to the forward and rear ends, respectively, of the longitudinal beam and adapted to elevate or depress either end of said beam at will, the plow $j$, carried by said beam and adjustable therewith, the horizontal shaft $r$, supported on said frame and geared to one of the carrying-wheels, the vertical shaft $w$, the sprocket-wheel $s$, fitted in the shaft $r$ and adapted to be clutched thereto by the clutch and lever, the drive-chain operating sprocket-wheels on the shafts $r$ $w$, and the horizontal flat separating-disk carried by the shaft $w$ in rear of and below the plow $j$ and provided with the radial horizontal ribs $z$ on its upper side, as herein shown and described.

In testimony that I claim the foregoing I hereunto affix my signature this 17th day of July, A. D. 1890.

JESSE CHILDS. [L. S.]

In presence of—
 M. E. HARRISON,
 RICHARD S. HARRISON.